United States Patent [19]

Suzuki

[11] 4,198,986
[45] Apr. 22, 1980

[54] RADIOACTIVE-RAY COUNTING SYSTEM

[75] Inventor: Kenji Suzuki, Tokyo, Japan

[73] Assignee: Tokyo Shibaura Electric Co., Inc., Kawasaki, Japan

[21] Appl. No.: 854,610

[22] Filed: Nov. 25, 1977

[30] Foreign Application Priority Data

Nov. 26, 1976 [JP] Japan .................................. 51/141830

[51] Int. Cl.² .......................................... A61B 10/00
[52] U.S. Cl. .......................................................... 128/659
[58] Field of Search ................. 128/2 A, 2 R, 2.05 P, 128/2.05 R, 2.05 T, 2.06 A, 2.06 F, 2.06 R

[56] References Cited

U.S. PATENT DOCUMENTS

| | | | |
|---|---|---|---|
| 3,171,892 | 3/1965 | Pantle | 128/2.05 R |
| 3,554,188 | 1/1971 | Lasch et al. | 128/2.06 F |
| 3,593,705 | 7/1971 | Thomas et al. | 128/2.06 A |
| 3,878,373 | 4/1975 | Blum | 128/2 A |

FOREIGN PATENT DOCUMENTS 1389672   4/1975   United Kingdom .................... 128/2 A

*Primary Examiner*—William E. Kamm
*Attorney, Agent, or Firm*—Cushman, Darby & Cushman

[57] ABSTRACT

Pulses produced substantially in Poisson's distribution are counted and the information relating to the counted pulses is displayed. In order to correct the non-linearity of the count rate characteristic of the counter apparatus, a dead zone of time is established during which pulses are not counted. This dead zone is established by the action of at least one circuit including two retriggerable monostable multivibrators series connected.

10 Claims, 8 Drawing Figures

RADIOACTIVE-RAY COUNTING SYSTEM

BACKGROUND OF THE INVENTION

The present invention relates to a counter apparatus for counting radioactive rays and, more particularly, a counter apparatus with a correction device for correcting the non-linearity of the count rate characteristic of the counter apparatus.

By convention, in case of the heart diagnosis in nuclear medicine, a radioisotope is injected into a patient's blood and radioactive rays, for example, gamma rays, produced by the nuclear decay of the radioisotope are measured by a scintillation camera, for example. In this case, the pulse rate of the gamma rays supplied to a detector of the scintillation camera per unit time generally does not coincide with the count rate of the counter apparatus at the final stage of display. That is, the count rate of the counter apparatus should be a linear function of the input pulse rate as shown in a straight line indicated by reference character A in FIG. 1. However, the count rate actually changes curvilinearly as indicated by reference character r. The reason for this difference is that, while radioactive pulses due to gamma rays are produced substantially in a Poisson distribution, the scintillation camera fails to count some pulses as a result of its proper dead time. The number of counts omitted increases as the input pulse rate increases.

As will be easily understood, when the relation of the count rate to the input pulse rate is not linear, data obtained are distorted, thus resulting in incorrect observations of the patient's heart.

Therefore, it is desirable for the scintillation camera to count linearly with regard to the input pulse rate at least within a practical use range. For example, in the conventional scintillation camera, if the dead time is 5 $\mu s$ and the input pulse rate is 25 kcps (kilocounts per second), the actual count rate curve deviates approximately 10% from the ideal count rate characteristic curve, i.e. linear characteristic.

One method used to correct this non-linear relationship so as to produce the ideal linear curve, the data obtained by the scintillation camera, i.e. those displayed in the display device, are inputted to a computer and processed by using a specific software. For example, in the computer, all the counting data are stored and thus collected data are multiplexed by proper correcting coefficients to add the count-missed value to the counting value.

However, this method is disadvantageous in that it fails to correct the non-linearity of the count rate in real time.

SUMMARY OF THE INVENTION

Accordingly, an object of the present invention is to provide a counter apparatus having a dead time of counting operation by which the non-linearity of its count rate characteristic due to the dead time accompanied by the count-missing of the input pulses may be corrected in real time.

Occurrence of pulses of gamma ($\gamma$) ray due to nuclear decay of radioisotope distributes substantially in Poisson's distribution. Assume that these gamma ray pulses are counted by a counter apparatus such as a scintillation camera. The distribution of the time interval t for two adjacent events (occurrence of the gamma ray pulses) is given by:

$$g(t)/n = e^{-nt}$$

where n is an average count rate and g(t) is an exponential distribution function of the time interval t.

The ratio $\epsilon_1$ of the count-missed pulses due to the dead time $\tau$ to all the incident pulses of gamma ray is given $$\epsilon_1 = \int_0^\tau g(t)dt = (1 - e^{-n\tau})$$

Accordingly, the count rate characteristic curve r of the counter apparatus is expressed $$r = n(1-\epsilon_1) = ne^{-n\tau}$$

In order to correct the non-linear curve r of count rate within a necessary range, it is required to reduce or thin out incident gamma ray pulses corresponding to the count rate portion (indicated by vertical thin lines in FIG. 2) of the r curve deviated from the straight line B (Kn) in FIG. 2. In this case, the count rate $\Delta r$ to be reduced for reforming the characteristic curve r into the rectilinear line B is $$\Delta r = n(e^{-n\tau} - K)$$

where K is a constant defined by the crossing points of the characteristic curve r intersecting the straight line B. The constant K given when the count rate to be corrected is set up has the following relations $$0 < K < 1$$
and
$$0 < n < -(\ln K)/\tau$$

The omission of the count rate $\Delta r$ in real time enables the count rate to be corrected in real time. This is realized in such a manner that the dead zone is set up in the time interval zone being much longer than the proper dead time $\tau$ of the counter apparatus and the count of the incident gamma ray pulses during the time interval within the dead zone is omitted, i.e. count-omitted. That is, the dead zone is a pulse count-omitting zone. This will be detailed with reference to FIG. 3. In the figure, a time interval distribution curve $g_1(t)$ with its average count rate $n_1$ is expressed by an equation $g_1(t) = n_1 e^{-n_1 t}$, and another distribution curve $g_2(t)$ with its average count rate $n_2$ by an equation $g_2(t) = n_2 e^{-n_2 t}$. Here, $n_1$ is larger than $n_2$. The dead zone is set up for the incident pulses falling within the periods of time from T to T+$\Delta$T. T is the time interval being sufficiently longer than the dead time of the counter apparatus and $\Delta$T is an incremental time interval for the time interval T. In this way, the incident pulses within the shadow portion slanted downwardly to the right may be count-omitted. In other words, since lines A and B, as shown in FIGS. 1 and 2, respectively, are defined as linear functions, if the relationship between the non linear count rate r and line B is calculated, then the count rate r will be able to be corrected so as to approach the linear function A. Another shadow portion slanted downwardly to the left indicates the zone where the pulses are count-missed due to the proper dead time $\tau$ of the counter apparatus. It shows that the number of the count-omitted pulses for the average count rate $n_1$, i.e. 40 KCPS of the input pulse rate is much smaller than that for the average count rate $n_2$, i.e., 20 KCPS of the input pulse rate. (See FIG. 2.)

The ratio $\epsilon_2$ of the count-omitted pulses to all the incident radioisotope pulses during the period of time T to $T+\Delta T$ of dead zone is given $$\epsilon_2 = \int_T^{T+\Delta T} g(t)dt = e^{-nT} - e^{-n(T+\Delta T)}$$

Therefore, the count rate to be reduced is $$\Delta r = n\{e^{-nT} - e^{-n(T+\Delta T)}\}$$

Turning now to FIG. 4, there are depicted a curve C representing variation of the ratio $\epsilon_2$ of the count rate to be reduced to the average count rate n for the correction of the linearity with respect to the average count rate, and a $\Delta r/n$ curve of the ratio of the count rate to the average count rate to be actually reduced in the dead zone during the time intervals from T to $T+\Delta T$ with respect to the average count rate n. A $\Delta r'/n$ curve represents variation of the ratio of the count rate to the average count rate when another dead zone is set up.

As seen from the figure, the curve of the count rate $\Delta r$ to be reduced in one dead zone during one time period from T and $T+\Delta T$ is not necessarily coincident with the curve representing the count rate C to be reduced. However, if a plurality of dead zones are set up, the count rate characteristics $\Delta r$, $\Delta r'$ ... of these dead zones are synthesized so that the actual reduction which is represented by a summation of $\{\Delta r/n + \Delta r'/n + ... \}$ curve approaches to the count rate curve C to be reduced with the minimum tolerable range.

This fact led to the present invention.

In brief, the present invention may be summarized as involving a counter apparatus comprising first means including a first unit for counting pulses inputted with random time intervals and a second unit for displaying the data corresponding to the number of pulses counted in the first unit, the first means having a non-linearity of the count rate due to its proper lower limit of the time intervals of the countable pulses and second means for selectively omitting counting of the pulses inputted with time intervals longer than the proper lower limit of the first means.

The present invention will be better understood from the following description taken in connection with the accompanying drawings, in which:

DETAILED DESCRIPTION OF THE PREFERRED EMBODIMENT

Figure 1:
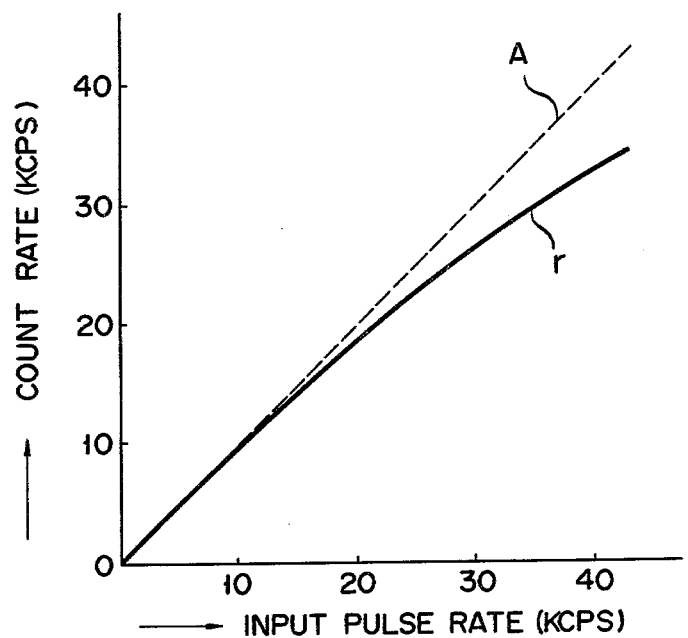
FIG. 1 shows an ordinary characteristic curve of the count rate of a counter apparatus.
Figure 2:
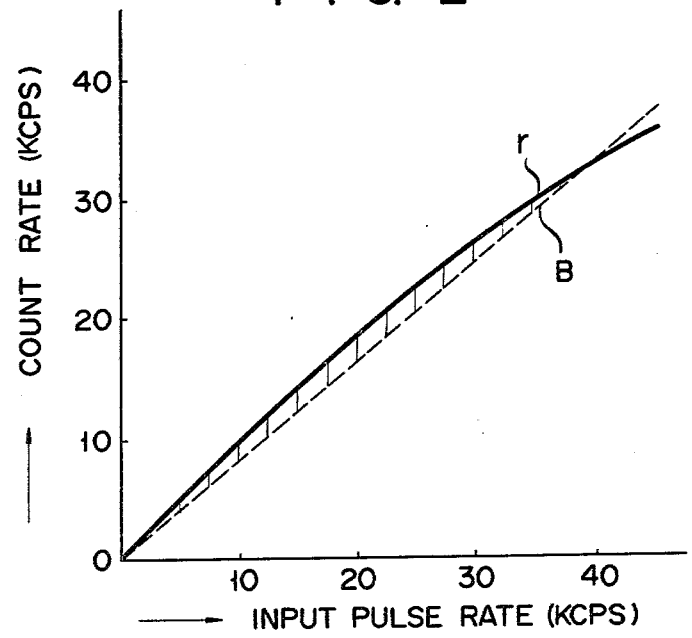
FIG. 2 shows a similar characteristic curve of the count rate of the counter apparatus.
Figure 3:
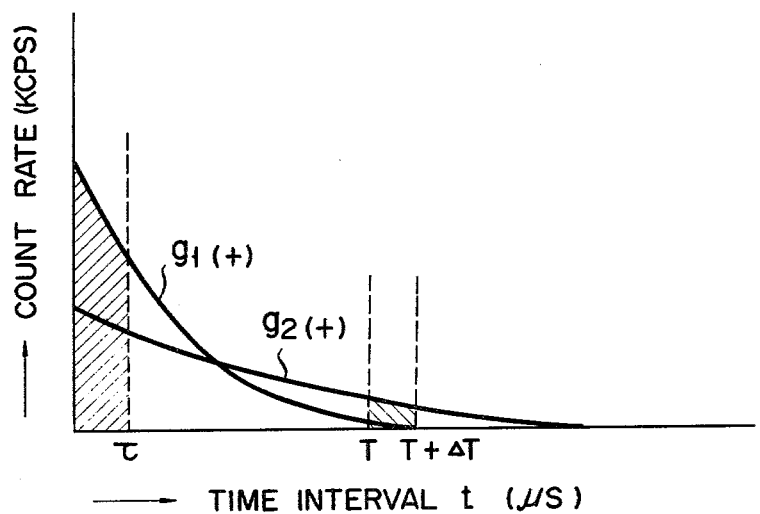
FIG. 3 shows time interval distribution curves of gamma ray pulses produced due to nuclear decay of radioisotope.
Figure 4:
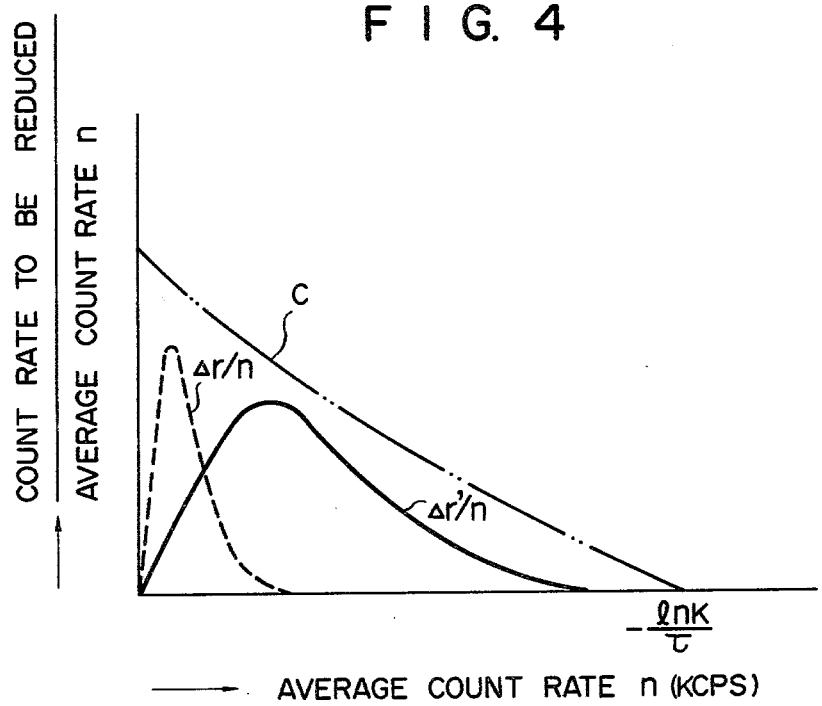
FIG. 4 shows characteristic curves of the ratio of the count rate to be reduced to the average count rate with respect to the average count n.
Figure 5:
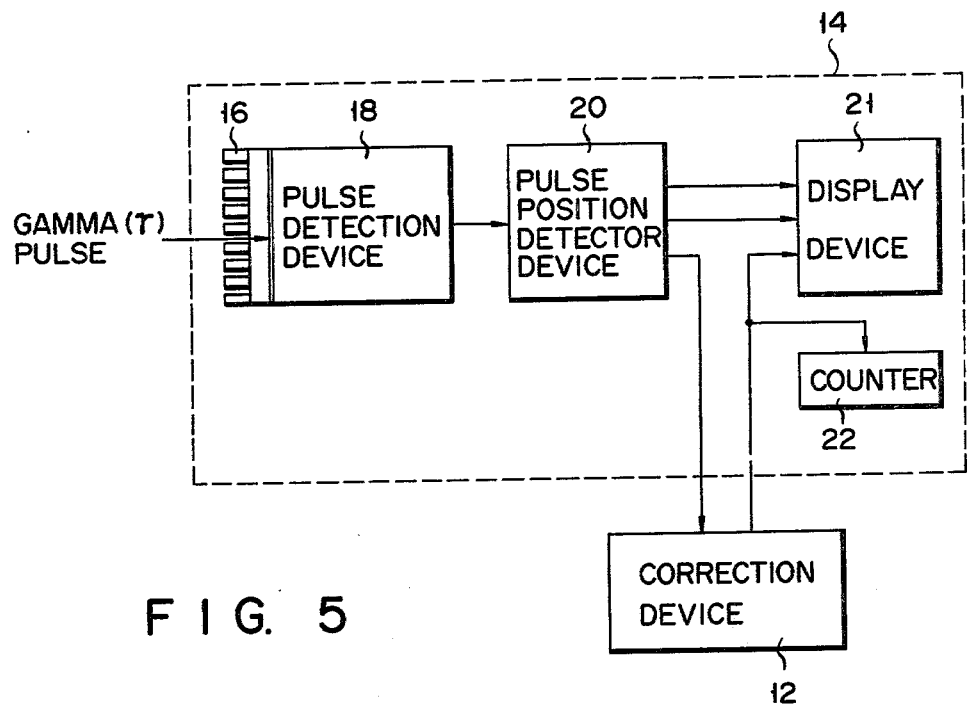
FIG. 5 shows a block diagram of a scintillation camera with a correction device according to the present invention.

Referring now to FIG. 5, there is shown a scintillation camera 14 into which a correction device 12 is incorporated. The scintillation camera 14 is comprised of a collimator 16 onto which gamma ray pulses produced due to nuclear decay of radioisotope are irradiated, a pulse detection device 18 for detecting number of pulses incident upon the collimator 16, a pulse position detector device 20 for calculating incident pulse position, a display device 21 for visualizing a signal coming from the pulse position detector device 20, a correction device 12 disposed between the pulse position detector device 20 and the display device 21, and a counter 22 for counting the data corrected by the correction device 12.

The circuit construction of the correction device 12 will be given in detail with reference to FIG. 6. A pair of retriggerable monostable multivibrators 24 and 26 are connected in series. Another pair of retriggerable monostable multivibrators 28 and 30 are also connected in series. These retriggerable monostable multivibrators are commercially available. One of them available is SN74123 manufactured by Texas Instrument Corporation. As shown, the trigger input B of the multivibrator 24 is connected to the input terminal IN of the correction device 12. The output terminal $\bar{Q}$ of the multivibrator 24 is connected to the trigger input terminal B of the succeeding multivibrator 26 of which output terminal $\bar{Q}$ is connected to a first input terminal of an NAND circuit 32. The multivibrator 28 is connected at the trigger input terminal B to the input terminal IN of the correction circuit 12 and at the output terminal $\bar{Q}$ to the input terminal of the multivibrator 30. The output terminal of the multivibrator 30 is coupled with a second input terminal of the NAND circuit 32. The input terminal IN of the correction device 12 is also connected directly to the third input terminal of the NAND gate 32. The output of the NAND gate 32 is connected to the output terminal OUT of the correction device 12, through an inverter 34.

These multivibrators 24 to 30 operate at the leading edge of the input pulse. The multivibrator 24 is controlled by input pulses fed from the input terminal IN of the correction device and produces pulses with pulse width $T_1$ longer than the dead time $\tau$ of the scintillation camera 14. The multivibrator 26, controlled by the output pulse of the multivibrator 24, produces pulses having a pulse width $\Delta T_1$. The multivibrator 28, controlled by the input pulse fed from the input terminal IN produces pulses having pulse width $T_2$, longer than the pulse width $T_1$. The multivibrator 30 is controlled by the output $\bar{Q}$ of the multivibrator 28 and produces an output pulse with pulse width of $\Delta T_2$.

The NAND gate 32 has three input terminals connected to the input terminal IN of the correction device 12 and to the output $\bar{Q}$ of the multivibrator 26, and the output $\bar{Q}$ of the multivibrator 30. The inverter 34 inverts the output pulse of the NAND gate 32 in phase and feeds it to the output terminal OUT of the correction device 12.

The explanation to follow is the operation of thus far mentioned correction device 12 when it is incorporated into the scintillation camera 14 shown in FIG. 5. Assume that the dead time $\tau$ of the scintillation camera 14 depends on the processing capacity of the pulse detection device 18.

Nuclear decay of the radioisotope (not shown) takes place to produce gamma ray pulses and the collimeter 16 is subjected to irradiation of the gamma ray pulses. Upon this irradiation, the pulse detection device 18 counts a number of gamma ray pulses. As mentioned above, the pulse detection device 18 has its proper dead time $\tau$ so that it misses to count the pulses produced in time intervals narrower than the dead time, and therefore it exhibits non-linear count rate. The output pulses of the pulse detection device 18 is fed to the pulse position detector device 20 where the positions of the pulses are detected. The pulse position detector device 20 produces two position signals, for example, for positioning in an orthogonal coordinate system, i.e. x and y coordinate axes signals, and an unblanking signal, i.e. an intensity modulation signal, reflecting the pulse information from the pulse position detection device 20. These position signals are then applied to the display device 21, for example, a cathode ray tube. The unblanking signal is applied to the correction device 12 for correcting the non-linearity of the pulse detection device 18.

The operation of the correction device 12 will be given referring to FIGS. 7A to 7G.

Figure 6:
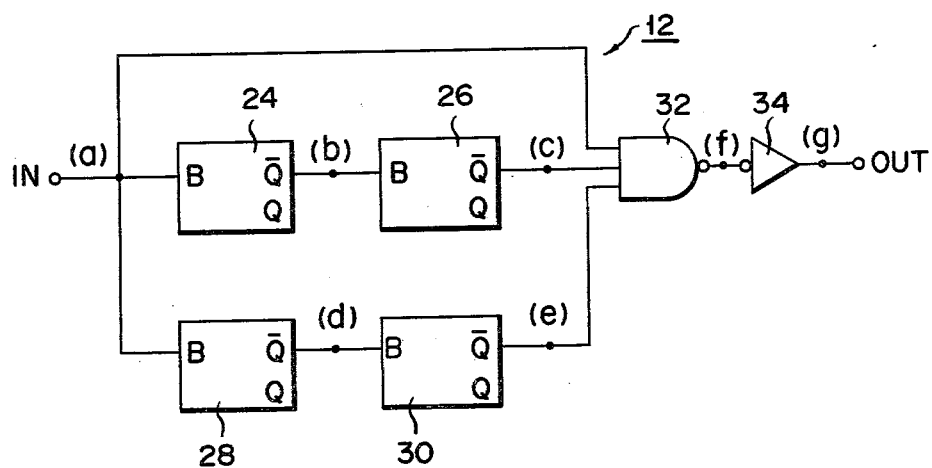
FIG. 6 shows a circuit diagram of the correction device shown in FIG. 5.

The individual waveforms in FIGS. 7A to 7G correspond to those at points (a) to (g) in FIG. 6. As shown, the point (a) is a connection point between the input terminal IN and the input B of the vibrator 24, the point (b) a connection point between the output $Q$ of the vibrator 24 and the input terminal B of the vibrator 26, the point (c) a connection point between the output $\bar{Q}$ of the vibrator 26 and the first input terminal of the NAND gate 32, the point (d) a connection point between the output $\bar{Q}$ of the multivibrator 28 and the input B of the multivibrator 30, the point (e) a connection point between the output $\bar{Q}$ of the multivibrator 30 and the second input terminal of the NAND gate 32, the point (f) a connection point between the output of the NAND gate 32 and the input of the inverter 34, and the point (g) a connection point between the output of the inverter 34 and the output OUT of the correction device 12.

At time $t_0$, the point (a) is at low level since no gamma ray pulse appears thereat, the points (b) to (f) are at high level, and the point (g) at low level.

At time $t_1$, assume that a gamma ray pulse is inputted to the input IN, and thus to the inputs B of the multivibrator 24 and 28 and to third input terminal of the NAND gate 32. At the leading edge of the gamma ray pulse, the state of each multivibrator 24 and 28 is inverted and the outputs of them are at low level. At this time, the outputs of the multivibrators 26 and 30 remain unchanged so that the NAND gate 32 is enabled to permit the gamma rays pulse to pass therethrough. As a result, the point (f) becomes low level which in turn is inverted by the inverter 34 and thus the point (g) becomes high level.

Figure 7:
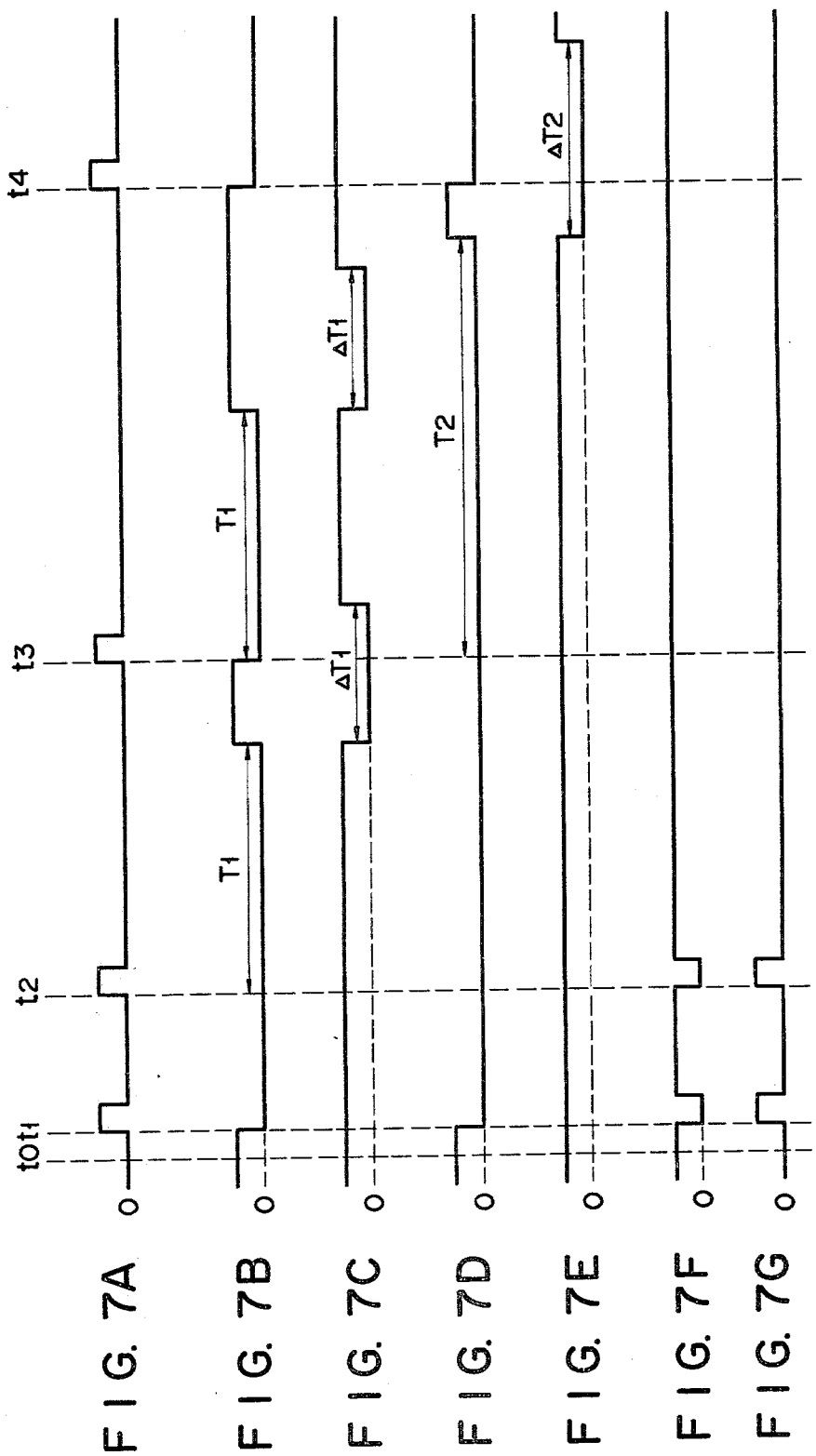
FIG. 7 shows a set of signal wave forms at the respective portions of the correction device shown in FIG. 5.

Succeedingly, a second pulse is inputted at time $t_2$. As shown, when the time interval between the time $t_1$ and $t_2$ is shorter than the pulse width $T_1$ of the output pulse of the multivibrator 24, it is triggered again or retriggered before the output of it returns to high level, and therefore it keeps its output $\bar{Q}$ unchanged, see FIG. 7B. Thus, the output level of the multivibrator 24 is maintained to be low. This is correspondingly applied to the multivibrator 28 operation so that the multivibrator 28 keeps its output at low level, as shown in FIG. 7D. Accordingly, the input pulses inputted with the time interval shorter than the time interval $T_1$ are all permitted to pass through the NAND gate 32 and then the inverter 34 to reach the output OUT.

When no succeeding gamma ray pulse is inputted during the time interval $T_1$ after the multivibrator 24 is triggered, the multivibrator 24 returns to its initial state after the time interval $T_1$. That is, as shown in FIG. 7B, the output Q of the multivibrator 24 changes from low to high level. Upon this level change, the multivibrator 26 is triggered to invert its state, see FIG. 7C. This state of the multivibrator 26 is continued for the time interval $\Delta T_1$.

Under this condition, at time $t_3$, a third pulse is inputted. Note here that the time interval between the second pulse and the third pulse is longer than $T_1$ but shorter than $T_1 + \Delta T_1$. At this time, the output Q of the multivibrator 26 is at low level as shown in FIG. 7C. Accordingly, the NAND gate 32 blocks passing therethrough of the third pulse. In other words, this is the pulse count-omitting or reduction operation.

This operation is correspondingly applied to the multivibrators 28 and 30 combination. For example, at time $t_4$, a fourth pulse is inputted distanced from the third pulse by the time interval longer than the time interval $T_2$ but shorter than the time interval $T_2 + \Delta T_2$. This fourth pulse is blocked as in the third pulse on the similar reason.

Figure 8:
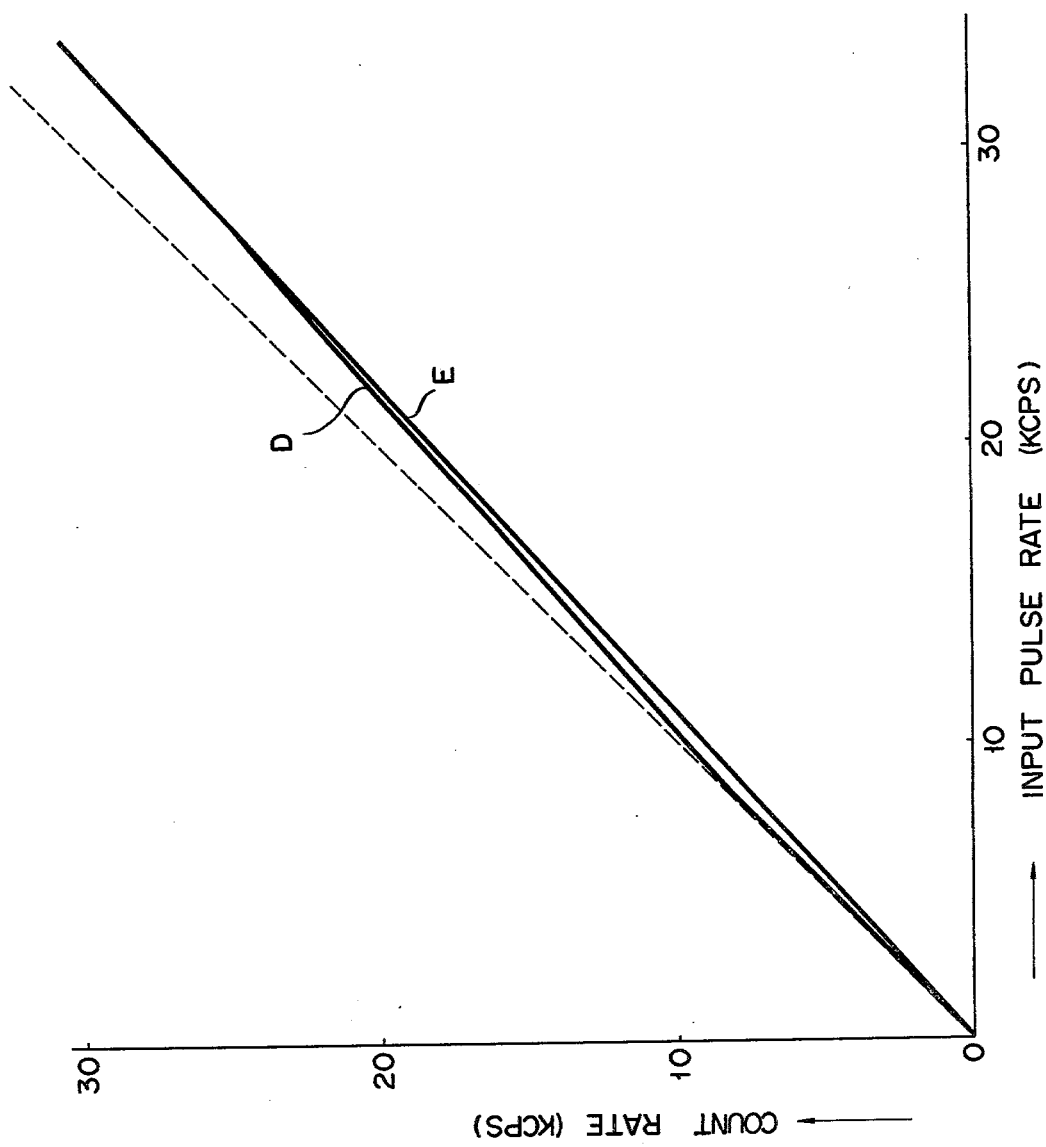
FIG. 8 shows a graph illustrating the relationship of the count rate to the input pulse rate when the correction device shown in FIG. 5 is used.

For example, the scintillation camera with 5 $\mu$s dead time was corrected under a condition that $T_1 = 250$ $\mu$s, $\Delta T_1 = 50$ $\mu$s, $T_2 = 1$ ms and $\Delta T_2 = 150$ $\mu$s, and the dead time zones are set up for the time intervals $T_1 + \Delta T_1$ and $T_2 + \Delta T_2$. In this correction, when the count rate is 30 kcps, the deviation from the linear characteristic was approximately 1.2%, although it was approximately 10% when no correction is made. The result of the measurement of the correction is traced in FIG. 8, in comparison with that of the no correction case. In the figure, a curve D is the count rate variation before the counter apparatus is corrected and a curve E that after it is corrected.

Thus corrected unblanking signal is applied to the display device 21 and the counter 22.

In this manner, the correction device 12 incorporated into the scintillation camera 14 blocks passing of the pulses inputted with longer time intervals to correct the non-linearity of the count rate due to the proper dead time in real time fashion. Further, in the correction, there is no need for memory or integrator for storing data, thus resulting in simplicity of circuit construction.

Although two dead zones were used, more number of dead zones may be used. In the case, more number of series connected monostable combinations are connected in parallel between the input IN and the output OUT of the correction device 12.

In the example thus far mentioned, the dead time of the scintillation camera depends on that of the detector 18. The similar effects may be obtained when it depends on that of the pulse position detector device 20 or the display device 21.

Only one of given number of input pulses may be count-omitted, i.e. blocked, unlike the above-mentioned case blocking all the input pulses inputted within the dead time set up. Alternately, all of the input pulses inputted with time intervals longer than a given time interval or one of given number of pulses may also be count-omitted. In this case, proper combination of the dead zones and pulse count-omitted ratios ensures good correction.

The correction circuit may be applied for any type of counter apparatuses for counting pulses occurring in Poisson's distribution as well as the scintillation camera mentioned above.

What is claimed is:

1. A radioactive-ray counting system comprising;
   means for detecting radioactive-rays occurring at random time intervals and generating pulses in response to said detected rays;
   means for counting said pulses from said means for detecting;
   means for displaying data indicative of said pulses counted by said means for counting;
   count-rate correcting means for inhibiting said means for counting from counting said output pulses from said means for detecting during a predetermined time interval, said time interval being longer than the proper dead time of said means for detecting thereby correcting the non-linearity of the overall count-rate characteristic of said radioactive ray counting system due to the proper dead time.

2. A radioactive-ray counting system according to claim 1, wherein said count-rate correcting means inhibits said counting means from counting said output pulse of said detecting means within the time intervals from T to T+$\Delta$T where T is longer than the proper dead time and $\Delta$T is an incremental time interval for the time interval of T.

3. A radioactive-ray counting system according to claim 1, wherein said detecting means detects radioactive-ray pulses occurring substantially in a Poisson distribution.

4. A radioactive-ray counting system according to claim 3, wherein said count-rate correcting means inhibits said counting means from counting said pulses from said detecting means in accordance with the following equation:

$$\Delta r = n \{e^{-nT} - e^{-n(T+\Delta T)}\}$$

where:
   $\Delta r$ is a count-omitting rate
   n is an average count rate,
   T is a time interval which is sufficiently longer than the proper dead time of said detecting means, and
   $\Delta T$ is an incremental time interval for the time interval of T.

5. A radioactive-ray counting system according to claim 2, wherein said count-rate correcting means comprises:
   a pulse input terminal for receiving said pulses from said detecting means;
   a retriggerable monostable multivibrator coupled to said pulse input terminal for producing a first monostable pulse having a width equal to the time interval of T;
   a second monostable multivibrator which is triggered by said monostable pulse from said retriggerable monostable multivibrator for producing a second monostable pulse having a pulse width of $\Delta T$; and
   a gate circuit for producing a gate pulse responsive to said pulses at said input terminal and said second monostable multivibrator.

6. A radioactive-ray counting system according to claim 1, wherein said count-rate correcting means comprises:
   a pulse input terminal for receiving the output pulse from said detecting means;
   a first retriggerable monostable multivibrator coupled to said pulse input termnal for producing an output pulse having a pulse width of $T_1$;
   a second monostable multivibrator which is triggered by the output pulse of said first retriggerable monostable multivibrator for producing an output pulse having a pulse width of $\Delta T_1$;
   a third retriggerable monostable multivibrator coupled to said pulse input terminal for producing an output pulse having a pulse width of $T_2$;
   a fourth monostable multivibrator which is triggered by the output of said third retriggerable monostable multivibrator for producing an output pulse having a pulse width of $\Delta T_2$; and
   a gate circuit for producing an output pulse responsive to the pulses supplied from said input terminal, said first monostable multivibrator and said fourth monostable multivibrator; said pulse widths of $T_1$ and $T_2$ respectively being longer than the dead time, and said pulse widths of $\Delta T_1$ and $\Delta T_2$ being incremental time intervals for the time interval $T_1$ and $T_2$, respectively.

7. A scintillation camera system comprising:
   first means for detecting gamma-ray pulses which are produced substantially in Poisson's distribution;
   second means for detecting the position of said gamma-ray pulses detected by said first means for producing a position signal and an unblanking signal;
   means for displaying a scintillation image in response to said position signal and said unblanking signal;
   means for counting the pulses of said unblanking signal;
   correcting means for inhibiting said displaying means and said counting means from displaying and counting said pulses of said unblanking signal falling within the time intervals from T to T+$\Delta$T where T is longer than the primarily proper dead time of said first means and $\Delta$T is an incremental time interval for the time interval of T, thereby correcting the non-linearity of overall count-rate characteristic in said scintillation camera system due to the proper dead time.

8. A scintillation camera system according to claim 7, wherein said correcting means inhibits said displaying means and said counting means for displaying and counting said pulses of said unblanking signal in accordance with the following equation;

$$\Delta r = n \{e^{-nT} - e^{-n(T+\Delta T)}\}$$

where:
   $\Delta r$ is an omitting rate for said displaying means and counting means, and n is an average detecting rate of said gamma-ray pulse.

9. A scintillation camera system according to claim 8, wherein said correcting means includes:
   a pulse input terminal for receiving the pulses of said unblanking signal,
   a first retriggerable monostable multivibrator coupled to said pulse input terminal for producing an output pulse having a pulse width equal to the time interval of T;

a second monostable multivibrator which is triggered by the output pulses of said first retriggerable monostable multivibrator so as to produce an output pulse having a pulse width of T; and a gate circuit for producing an output pulse in response to the pulses supplied from said input terminal and said second monostable multivibrator.

10. A radioactive-ray counting system according to claim 7, wherein said correcting means includes:

a pulse input terminal for receiving said pulses from said unblanking signal;

a first retriggerable monostable multivibrator coupled to said pulse input terminal for producing an output pulse having a pulse width of $T_1$;

a second monostable multivibrator which is triggered by the output pulse of said first retriggerable monostable multivibartor for producing an output pulse having a pulse width of $T_1$;

a third retriggerable monostable multivibrator coupled to said pulse input terminal for producing an output pulse having a pulse width of $T_2$;

a fourth monostable multivibrator which is triggered by the output pulse of said third retriggerable monostable multivibrator for producing an output pulse having a pulse width of $\Delta T_2$;

a gate circuit for producing an output pulse in response to the pulses supplied from said input terminal, said first monostable, multivibrator and said fourth monostable multivibrator; said pulse widths of $T_1$ and $T_2$ respectively being longer than the dead time, and said pulse widths of $\Delta T_1$ and $\Delta T_2$ being incremental time intervals for the time interval $T_1$ and $T_2$, respectively.

* * * * *